(12) United States Patent
Purlia (10) Patent No.: US 8,108,579 B2
(45) Date of Patent: Jan. 31, 2012

(54) MECHANISM AND METHOD FOR MANAGING DATA STORAGE

(75) Inventor: John Purlia, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 11/096,737

(22) Filed: Mar. 31, 2005

(65) Prior Publication Data

US 2006/0224793 A1    Oct. 5, 2006

(51) Int. Cl.
*G06F 13/38* (2006.01)
*G06F 3/00* (2006.01)

(52) U.S. Cl. ............... 710/74; 710/15; 710/18; 710/60; 710/62; 715/749; 715/756; 709/217; 709/218; 709/219; 707/644; 707/645; 707/646

(58) Field of Classification Search .................. None
See application file for complete search history.

(56) References Cited

U.S. PATENT DOCUMENTS

| | | | | |
|---|---|---|---|---|
| 5,367,698 A * | 11/1994 | Webber et al. | ............... | 395/800 |
| 5,617,566 A * | 4/1997 | Malcolm | ............... | 707/204 |
| 5,655,219 A * | 8/1997 | Jusa et al. | ............... | 455/338 |
| 5,875,459 A * | 2/1999 | Taoda | ............... | 711/114 |
| 5,991,753 A | 11/1999 | Wilde | | |
| 6,269,382 B1 * | 7/2001 | Cabrera et al. | ............... | 707/204 |
| 6,981,005 B1 * | 12/2005 | Cabrera et al. | ............... | 707/203 |
| 7,020,658 B1 * | 3/2006 | Hill | ............... | 707/102 |
| 7,080,277 B2 * | 7/2006 | Anna et al. | ............... | 714/2 |
| 7,236,988 B2 * | 6/2007 | Li et al. | ............... | 707/104.1 |
| 2002/0129375 A1 * | 9/2002 | Kim et al. | ............... | 725/100 |
| 2002/0133491 A1 * | 9/2002 | Sim et al. | ............... | 707/10 |
| 2003/0195895 A1 * | 10/2003 | Nowicki et al. | ............... | 707/100 |
| 2004/0243612 A1 * | 12/2004 | Bailey | ............... | 707/101 |
| 2005/0050292 A1 * | 3/2005 | Oh | ............... | 711/170 |

FOREIGN PATENT DOCUMENTS

| | | |
|---|---|---|
| EP | 1182554 | 2/2002 |
| WO | WO03027891 | 4/2003 |
| WO | WO2004055637 | 7/2004 |

OTHER PUBLICATIONS

International Search Report and Written Opinion—PCT/US2006/011748, International Search Authority—European Patent Office—Jul. 20, 2007.

Supplementary European Search Report—EP06740101, Search Authority—Munich Patent Office, Dec. 29, 2009.

* cited by examiner

*Primary Examiner* — Eron J Sorrell
*Assistant Examiner* — Dean Phan
(74) *Attorney, Agent, or Firm* — Robert J. O'Connell; James T. Hagler (57) ABSTRACT

Described are techniques and mechanisms for media data storage management. Briefly stated, a media control component monitors the usage patterns of media files on a local device. Any media files whose usage pattern falls below a given threshold is identified as a trim candidate. The media control component trims those trim candidates by eliminating data (content) from the media files. The data is eliminated from the latter portion of the media file so that the trimmed media file will continue to render properly when initially launched. If the trimmed media file is launched, the media control component retrieves the eliminated data from a content server on which is stored a library of media files.

26 Claims, 8 Drawing Sheets

MECHANISM AND METHOD FOR MANAGING DATA STORAGE

BACKGROUND OF THE INVENTION

The invention relates generally to the field of data storage, and more particularly to data storage on mobile devices.

Digital multimedia is growing at an enormous rate. More and more people are converting their personal media libraries to digital media. In addition, many consumers now purchase music and other media in digital format originally, eliminating the conversion process. Digital media has the benefit of being very portable. Many handheld computing devices can store digital media files to be played while the user is mobile, such as while exercising, driving, flying, or otherwise on the move.

Because of the convenience, many users desire to keep as much of their digital media libraries on their portable devices as possible. However, digital media files consume a relatively large amount of storage space, and computing devices generally have a limited storage capacity, especially mobile devices. So users must often settle for having less than their entire library on their mobile devices. This problem is exacerbated by the fact that manually migrating media files on to or off of portable computing devices is often a somewhat confusing process. For these reasons, users have tended not to change the content stored on their mobile devices that often.

A few attempts at solving this problem have evolved. One such attempt is essentially the "brute force" method of enlarging the storage capacity of computing devices. Larger and larger storage media, such as hard disk drives or flash memory drives, are constantly being created. One problem with this method is that it makes portable devices more and more expensive, consume more power, and sometimes larger than desired. The limited storage problem is more compelling in the area of portable devices, but also applies in other areas, such as in laptop, notebook, desktop, and other computing devices.

Another attempt to address the problem involves automating the process of changing the media files that are stored on the computing device. Some automated processes exist for copying media files from permanent storage, such as the user's desktop computing device, to the user's portable device. In practice, those media files that a user rarely invokes (e.g., listens to or views) are completely removed from the computing device, and new ones are copied to it. This process is often performed during a synchronization operation while the portable device is physically connected to the device that includes the library.

One shortcoming of this process is that to identify the files to include on the portable device, the user must interact with some remote data management utility that resides somewhere other than on the portable device, typically wherever the complete media library resides. For that reason, the user cannot easily identify, on the portable device, what content to include. Rather, the user must return to the computing device on which the data management utility resides. This requires advanced planning by the user, and often doesn't happen. An alternative is that the data management utility can randomly select new files to include, which of course is not likely to coincide with the content that the user would have personally selected.

An adequate method and mechanism for managing media data storage has eluded those skilled in the art, until now.

SUMMARY OF THE INVENTION

The invention is directed to methods and mechanisms for increasing apparent storage capacity on a computing device.

In one aspect, the invention envisions a method for managing data storage on a device. The method involves identifying one or more trim candidates from a plurality of files stored on a local storage of the device. A portion of each of the trim candidates on the local storage is trimmed based on usage heuristics associated with the plurality of files. In response to receiving an indication that a particular trim candidate is being accessed, the trimmed portion of the particular trim candidate is retrieved from remote storage as the particular trim candidate is being accessed.

In another aspect, the method envisions a method for serving data. The method includes receiving a request from a mobile device for trimmed content, the trimmed content comprising data that the mobile device had trimmed from a media file local to the mobile device so that the trimmed content no longer resides on the media file. In response to that request, the trimmed content is provided to the mobile device over a communications link.

In yet another aspect, the invention envisions a mechanism for managing data storage on a device having a plurality of files. The mechanism includes a communications module configured to facilitate communications between the device and a remote content server, a storage medium on which resides the plurality of files, and a media control component. The media control component is configured to monitor usage of the plurality of files to identify trim candidates, the trim candidates being media files that are accessed less frequently than a given threshold. The media control component is further configured to trim the trim candidates by eliminating data from the trim candidates on the storage medium.

DETAILED DESCRIPTION

What follows is a detailed description of various techniques and mechanisms for media data storage management. Generally stated, media files are stored on a local device. The usage of the media files is logged, and media files are "trimmed" once their usage falls below a given threshold. The media files are trimmed by eliminating data (content) from the media files, but not the entire media file. The data is eliminated from the latter portion (i.e., the end) of the media file so that the trimmed media file will continue to render properly initially if launched. If the trimmed media file is launched, the eliminated data is retrieved from a content server while the media file is being rendered on the local device.

Figure 1:
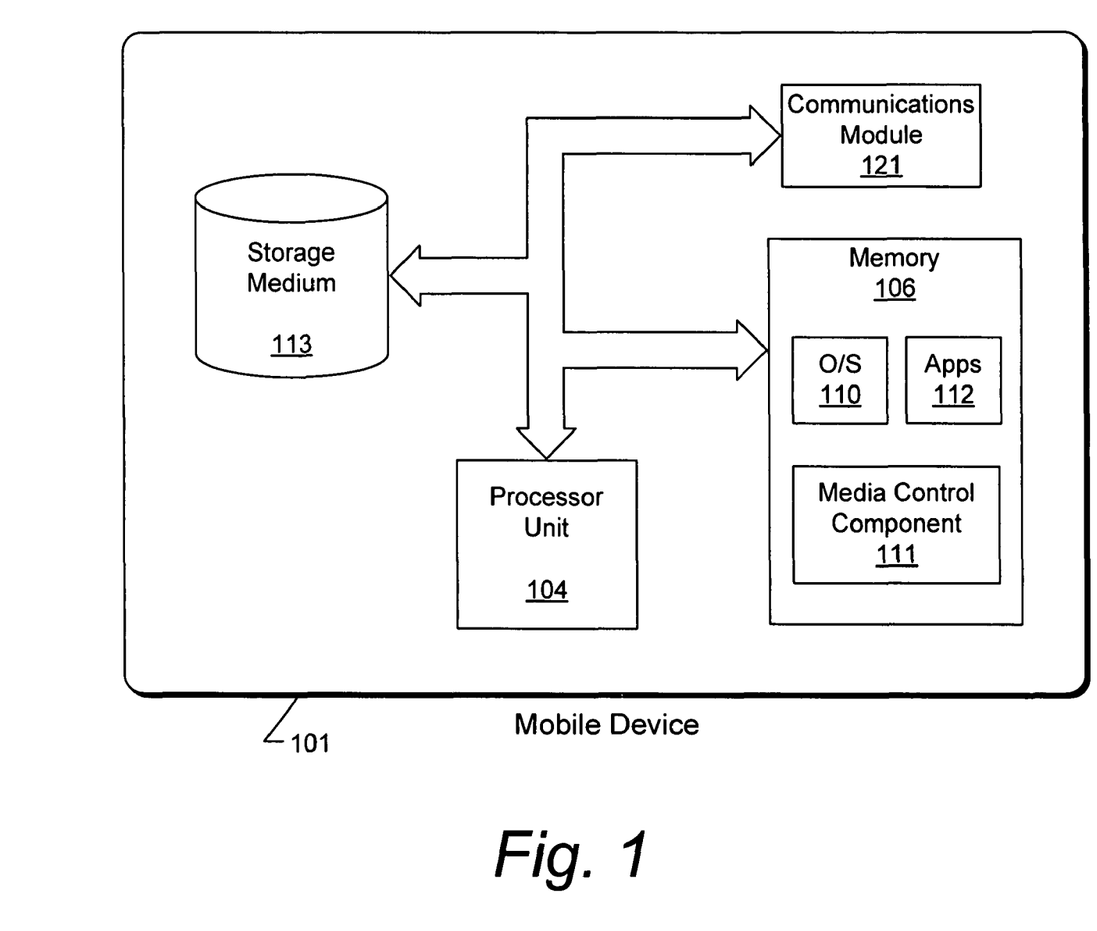
FIG. 1 is a functional block diagram generally illustrating a mobile device in which implementations of the invention are particularly applicable.

FIG. 1 is a functional block diagram generally illustrating a sample mobile device 101 in which implementations of the invention are particularly applicable. The mobile device 101 may be any handheld computing device, such as a cellular telephone, a personal digital assistant, a portable music player, a portable media center device, a global positioning satellite (GPS) device, or the like. Although described here in the context of a handheld computing device, it should be appreciated that implementations of the invention may have equal applicability in other areas, such as laptop, desktop, or server computing devices.

In this example, the mobile device 101 includes a processor unit 104, a memory 106, and a storage medium 113. The processor unit 104 advantageously includes a microprocessor or a special-purpose processor such as a digital signal processor (DSP), but may in the alternative be any conventional form of processor, controller, microcontroller, or state machine.

The processor unit 104 is coupled to the memory 106, which is advantageously implemented as RAM memory holding software instructions that are executed by the processor unit 104. In this embodiment, the software instructions stored in the memory 106 include an operating system 110, one or more applications 112, and a media control component 111 (described below). The memory 106 may be on-board RAM, or the processor unit 104 and the memory 106 could collectively reside in an ASIC. In an alternate embodiment, the memory 106 may be composed of firmware or flash memory.

The processor unit 104 is also coupled to the storage medium 113, which may be implemented as any nonvolatile memory, such as ROM memory, flash memory, or a magnetic disk drive, just to name a few. The storage medium 113 may also be implemented as any combination of those or other technologies, such as a magnetic disk drive with cache (RAM) memory, or the like. In this particular embodiment, the storage medium 113 is used to store data during periods when the mobile device 101 may be powered off or without power.

The mobile device 101 also includes a communications module 121 that enables bidirectional communication between the mobile device 101 and one or more other computing devices. The communications module 121 may include components to enable RF or other wireless communications, such as a cellular telephone network, Bluetooth connection, wireless local area network, or perhaps a wireless wide area network. Alternatively, the communications module 121 may include components to enable land line or hard wired network communications, such as an Ethernet connection, universal serial bus connection, IEEE 1394 (Firewire) connection, or the like. These are intended as non-exhaustive lists and many other alternatives are possible.

Figure 2:
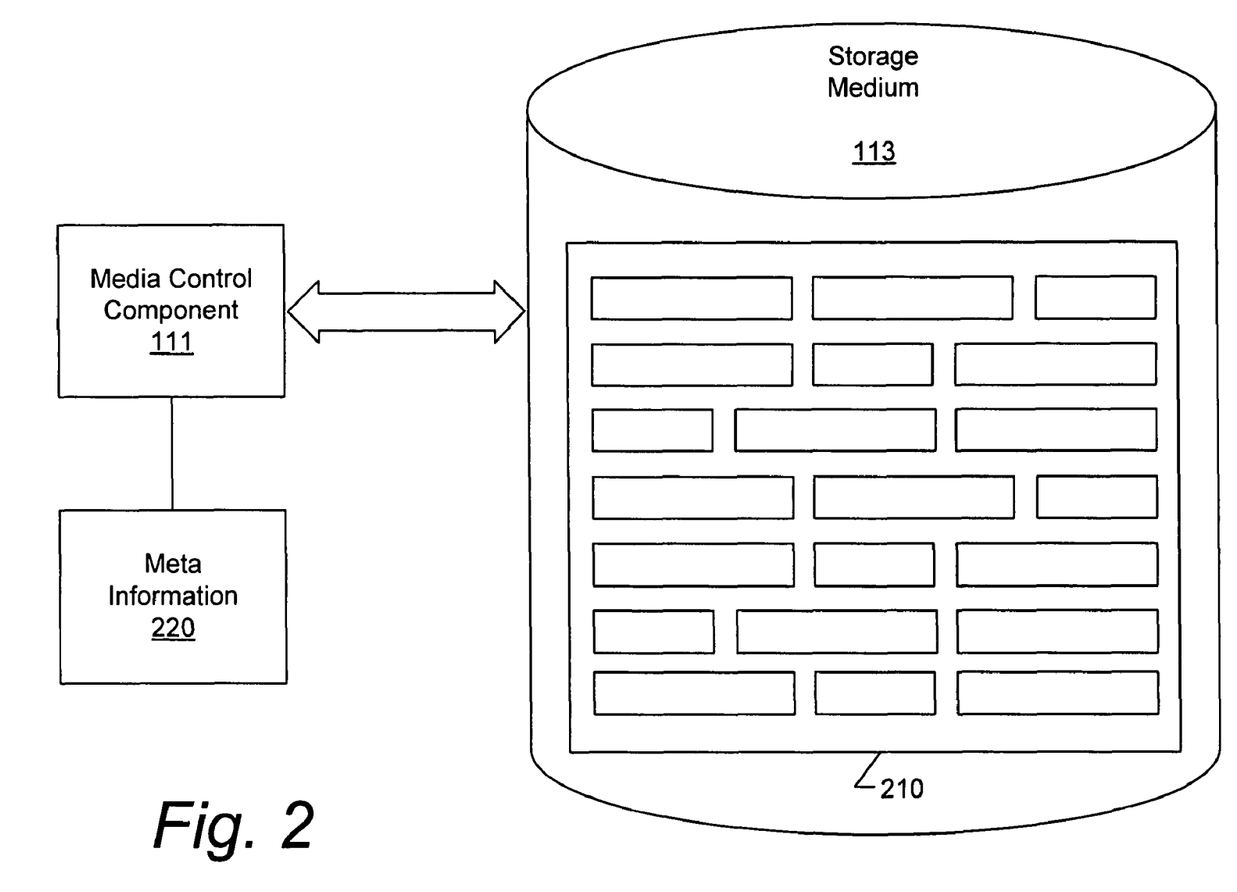
FIG. 2 is a functional block diagram generally illustrating a storage medium having a set of files under control of a media control device that is configured in accordance with an embodiment of the invention.

FIG. 2 is a functional block diagram generally illustrating the storage medium 113 and the media control component 111 introduced above. As mentioned above, the storage medium 113 is used to store data during periods when the mobile device may be powered off or without power. The storage medium 113 may be used to store contact information, appointment information, documents, and perhaps other information. In this particular example, the storage medium 113 is used to store media files 210 in the user's collection. The media files 210 may include music files, such as MPEG Layer 3 (MP3) files, or other media data, such as video files or photographs. For simplicity of discussion only, the media files 210 will be referred to as digital music files in this document. It should be noted, however that the media files 210 could be any collection of files in almost any format.

Each of the media files 210 consumes a significant amount of space on the storage medium 113. In this example, the media files 210 have exhausted the available capacity of the storage medium 113. However, the media files 210 do not represent the user's entire digital media library, but rather only those files that could fit on the available capacity of the storage medium 113. More media content exists in a remote location in the user's complete library, perhaps stored on network storage or another remotely-accessible computing system.

Studies show that music listening trends of consumers is unbalanced. In other words, if a consumer owns 100 compact discs they do not listen to each of those 100 discs in equal measures. The tendency of a consumer is to listen to new music or old favorites far more frequently than other titles in their collection. Accordingly, meta information 220 identifies the user's access patterns for each file in the media files 210. For example, if the media files 210 were all songs, the meta information 220 may include heuristic data about how often the user listens to each of the several songs. The meta information 220 may also indicate other meta data about the media files 210, such as when the files were first stored on the storage medium 113, when they were last accessed or modified, who owns the data, how much of each file is stored locally, and perhaps security or data rights management information about the media files 210. The meta information 220 could be collected by any mechanism, such as an operating system component, special purpose component, or even by the media control component 111.

The media control component 111 is a mechanism that is configured to manage the data stored on the storage medium 113, and in particular the media files 210. The core responsibility of the media control component 111 is to trim certain of the media files 210 based on usage data in the meta information 220. Generally stated, the media control component 111 performs two functions. First, it determines which of the media files 210 the user accesses (e.g., listens to in the case of music files) least frequently, and "trims" or truncates those files to something less than their entire size. Second, the media control component 111 causes the missing portions of any trimmed files that the user accesses to be downloaded, using the communications module 121, when the user accesses them.

More specifically, the media control component 111 may periodically or randomly review the meta information 220 to identify any trim candidates from among the media files 210. Trim candidates may be any file or files that the user has not accessed for some period of time, or perhaps not accessed more than some threshold number of times over a longer period of time. The media control component 111 may rank the media files 210 in order of how frequently they are accessed, or perhaps assign the files to one of several groups, such as frequently accessed, infrequently accessed, rarely accessed, and never accessed. These are but examples and many other implementations are possible.

Figure 4:
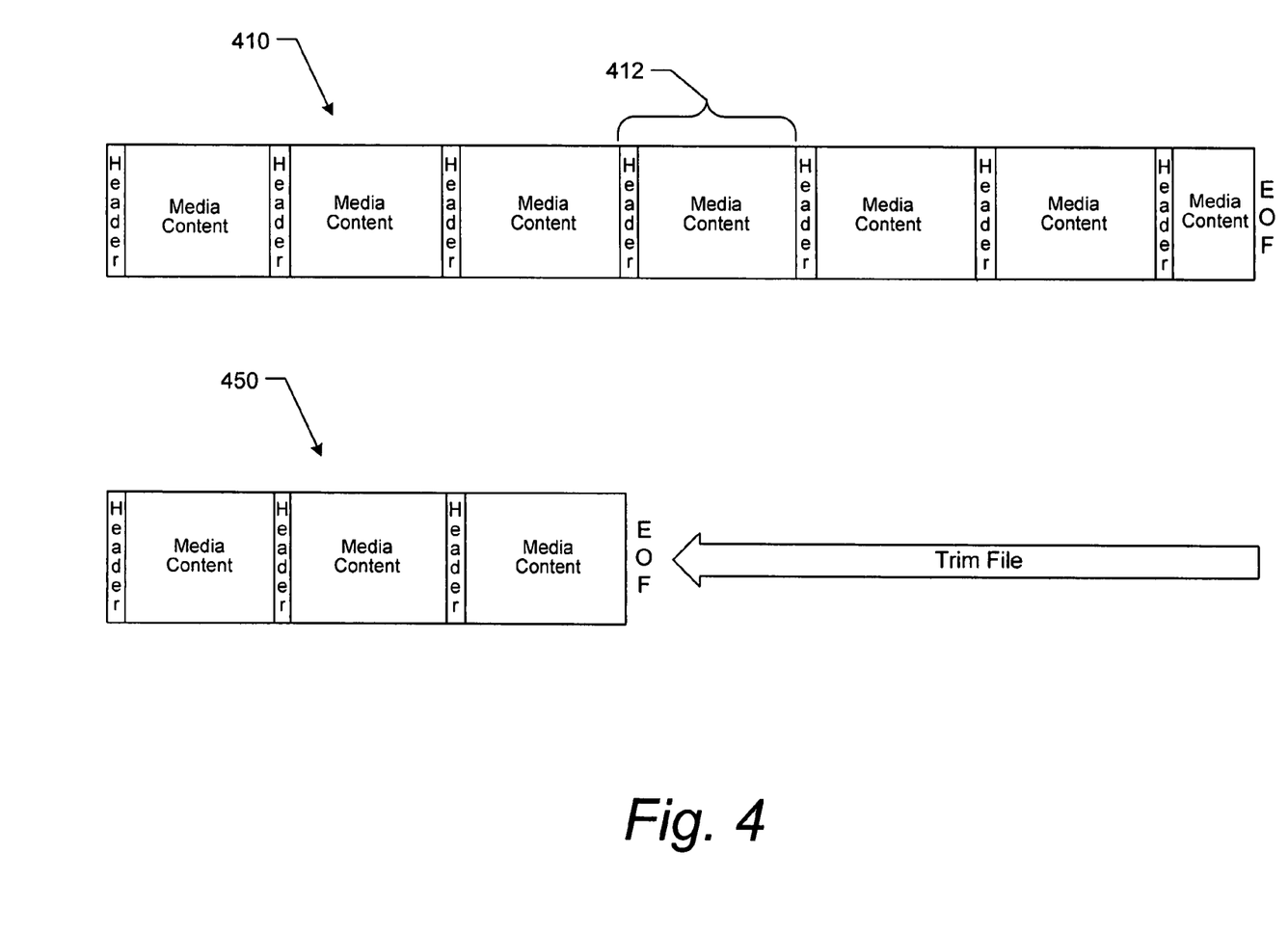
FIG. 4 is a functional block diagram generally illustrating the storage medium shown in FIG. 2 after having a set of files trimmed in accordance with one embodiment of the invention.

Once the trim candidates are identified, the media control component 111 trims a portion of at least some of those trim candidates. For the purpose of this discussion, "trimming" a file includes deleting data from a portion of the file, preferably not from the beginning of the file, in such a manner that the file continues to be readable. In other words, in the case of music files, once the media control component 111 identifies a song that the user listens to infrequently, it trims the song from the end of the song toward the beginning, thus leaving the beginning of the song on the storage medium 113 but still reducing the size of the file stored locally. The trimmed portion can be simply deleted, or could possibly be cut from the media file and stored elsewhere. One example technique for trimming a media file is illustrated in FIG. 4 and described below.

Figure 3:
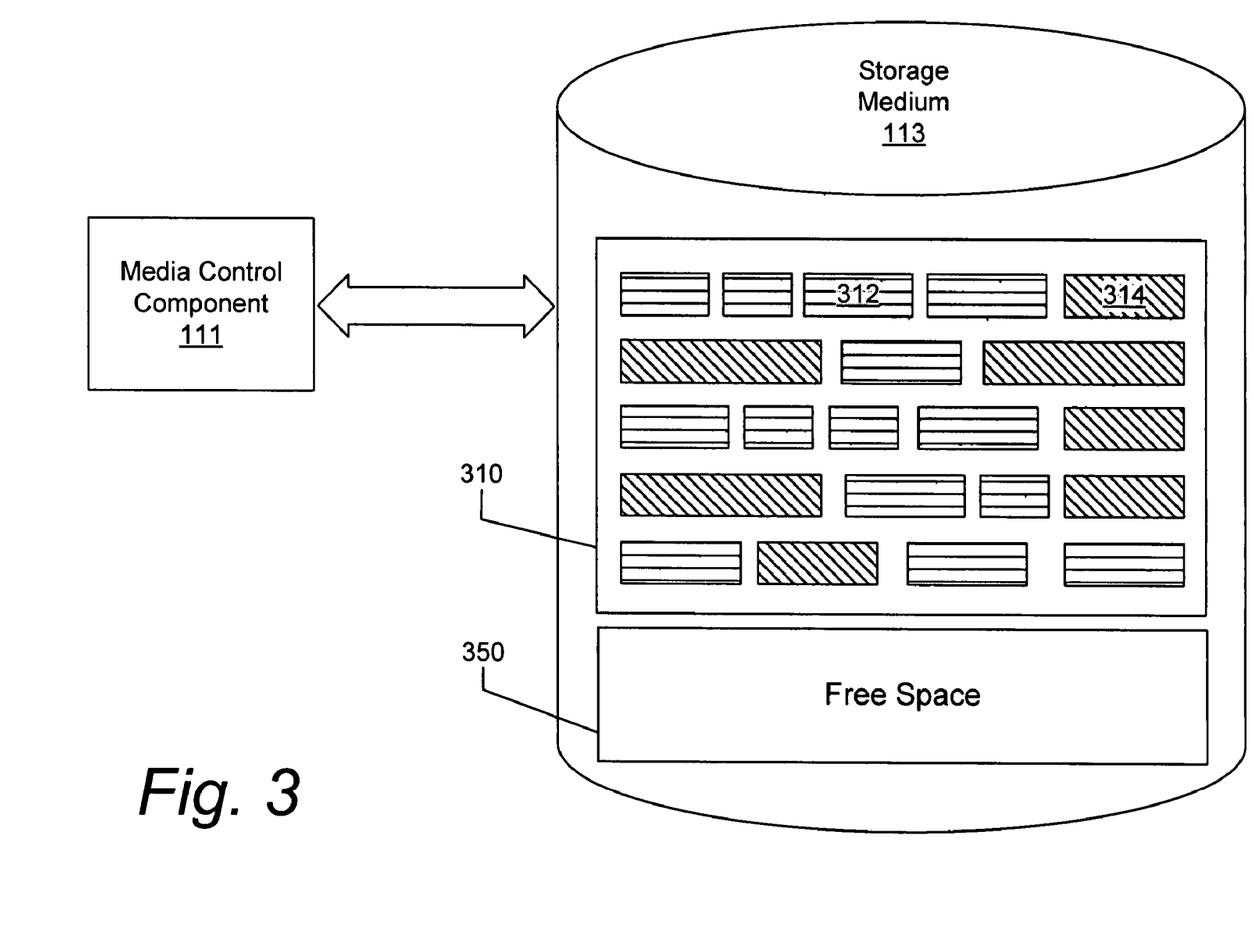
FIG. 3 is a conceptual illustration of a sample media file being trimmed to improve local storage capacity in accordance with an embodiment of the invention.

FIG. 3 is a functional block diagram generally illustrating the storage medium shown in FIG. 2 after having a set of files trimmed in accordance with one embodiment of the invention. As illustrated, the media control component 111, using the meta data in the meta information 220, identifies several trim candidates, which are media files 310 that the user has infrequently accessed. The media control component 111 then trims those trim candidates to some size smaller than their original, untrimmed size. Examples of the trimmed files are illustrated in FIG. 3 having horizontal lines, such as trimmed file 312. Other media files 310 which the user accesses more frequently are not trimmed. Examples of the untrimmed files are illustrated in FIG. 3 having diagonal lines, such as untrimmed file 314. Note that the overall size of the collection of media files 310 that includes trimmed files is smaller than the collection of completely untrimmed media files 210 shown in FIG. 2. This results in increased free space 350 on the storage medium 113 that can be used for additional storage. File system fragmentation issues could be managed in the background to accommodate inevitable gaps created by file trimming.

Taking advantage of the general technique just described, implementations of the invention can provide access to a greater portion of the user's media library, or perhaps even all of it, without increasing the capacity of the storage medium 113. Instead, the device includes a limited amount of storage that is used to store the complete versions of many or some media files, and only partial versions of other media files. Alternatively, all the files stored on the storage medium 113 may be partial versions of the entire file. The free space 350 on the storage medium 113 may be used to store portions of the remaining entries in the user's media library. For example, only the beginnings of each song in the user's music library may be stored locally on the storage medium 113. Alternatively, a table of contents or the like may be included that identifies the remaining entries in the user's media library. Similarly, the free space 350 (or some portion of it) could be used to store any other arbitrary information, including new media content (e.g., new music files purchased using the mobile device), ordinary data for use by other applications on the mobile device, or any other data.

In one implementation, the media control component 111 actively and algorithmically adapts the contents of the storage medium 113 to the user's changing listening habits. Frequently accessed files may be stored in full, while a "digital deterioration" algorithm would be applied to files that are accessed less frequently. In this implementation, the media control component 111 may make multiple trims of several files based on usage patterns, gradually decreasing the local size of the least frequently accessed files. Frequently accessed files may not be trimmed at all.

Figure 6:
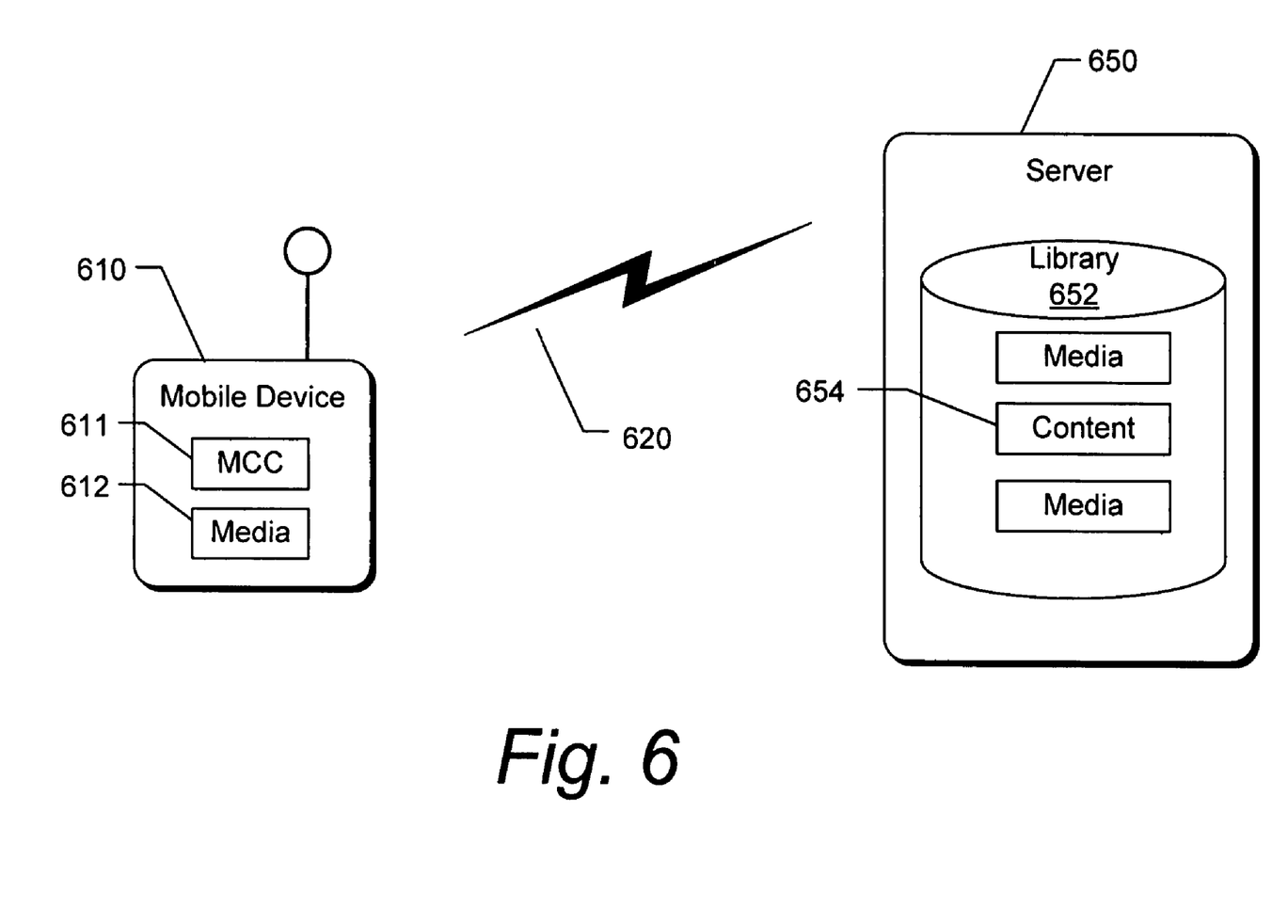
FIG. 6 is functional block diagram of a system for making available and retrieving content associated with a user's media library, in accordance with one embodiment of the invention.

As will be described in greater detail in conjunction with FIG. 6, the missing portion of any file that has been trimmed is retrieved dynamically on demand. In other words, if a user accesses a file (e.g., a song) that is only partially resident locally, the media control component 111 actively retrieves the missing content while rendering the content that is local. For example, if a song is only partially resident locally when the user activates the file to listen to it, the media control component 111 begins playing that portion of the song that is local, and while that is playing, retrieves the portion of the song that has been trimmed. In this way, the user experiences the illusion that all of the user's media file is resident locally, and indeed the user may immediately begin enjoying any media that is partially resident locally. Any missing content (i.e., content that has been trimmed) is retrieved "in the background" and the user may never even realize that the entire file was not local. There are several techniques for retrieving the missing portion that may be employed. FIG. 6 illustrates one such technique that has particular applicability for wireless mobile devices.

FIG. 4 is a conceptual illustration of a sample media file being trimmed to improve local storage capacity in accordance with an embodiment of the invention. Illustrated in FIG. 4 is a media file 410 that may represent one entry in a user's media library. In this example, the media file 410 may be in one of very many different media formats, such as the popular MPEG Layer-3 ("MP3") format that is widely used for digital music content.

Often media files, such as media file 410, are constructed of smaller parts called "frames," such as frame 412. Generally speaking, frames are independent elements of media content that fit together as a whole, and each frame has its own header with information that describes the data in that frame. There may not be a global file header, so if done correctly, the media file 410 can be "cut" in one or more of several places and yet the remaining portion of the file will still render on a media player correctly. Cutting the file 410 should be done on frame boundaries so that the header continues to correctly identify the frame, but many media renders can handle incorrect headers.

In some media formats, frames are dependent on each other and cannot be simply dissected as easily as just described. For example, frames in some media files encoded in the popular MP3 format may be interdependent and a more complex analysis must be performed to ensure that the portion of the media file 410 that remains is still able to be rendered properly. However, trimming or clipping media files is commonly performed and this discussion is merely an overview of the process.

As described above, if the usage of the media file 410 falls below some predetermined threshold, the media control component 111 trims it by cutting a portion of the media file 410 from the end of the content toward the beginning, preferably on a frame boundary, resulting in trimmed media file 450. Trimmed media file 450 represents the initial part of untrimmed media file 410, and if accessed by the user will play the beginning of the media.

The amount of the media file 410 that can be trimmed may vary for several reasons. For instance, the file format of the media file 410 may govern how much can be trimmed while still remaining partially usable. In one implementation, the media file 410 may be trimmed to some minimum size the first time that the media file 410 becomes a trim candidate. One definition of a "minimum size" is discussed later in conjunction with FIG. 5. In another implementation, the media file 410 may be trimmed in different amounts based on the frequency of use. For instance, a media file accessed fewer times than some initial threshold may be trimmed by an initial amount, such as 50%. If some additional time passes without the media file being accessed it may be trimmed by some additional amount, such as an additional 50% so that the file is now 25% of its original size. After still further time with no access, even more of the media file may be trimmed. This procedure may be repeated until the media file reaches some minimum size. A user interface could be used to provide some indication about which files are completely resident and which are partially resident, perhaps indicating the "percent local" or the like.

To illustrate, assume that the media file 410 is a song three minutes in length, encoded at a 10:1 compression ratio using 128-bit MP3. Under these conditions, the media file 410 might occupy approximately 2.8 MB of storage. As time passes without the song being played, the media file 410 is trimmed, first to one minute, then thirty seconds, then fifteen seconds, and finally to 5 seconds. At that point the storage space consumed by the trimmed media file 450 may be approximately 80 KB. The remaining 2.7 MB could be retrieved from the user's complete library, which may reside on a wirelessly-accessible server or the like, when the user accesses the trimmed media 450.

An additional enhancement may be to modify the amount of trimming that is done to files based on the usage patterns of the user. In such an implementation, the threshold at which trimming occurs would adapt to different users' listening habits. So, for example, a user who listens to the same set of music over and over again could experience a different deterioration threshold than a user who listens to a wider variety of music. The threshold could also be user configurable, allowing the user to control how much music is stored locally versus how much is retrieved from a remote location.

Figure 5:
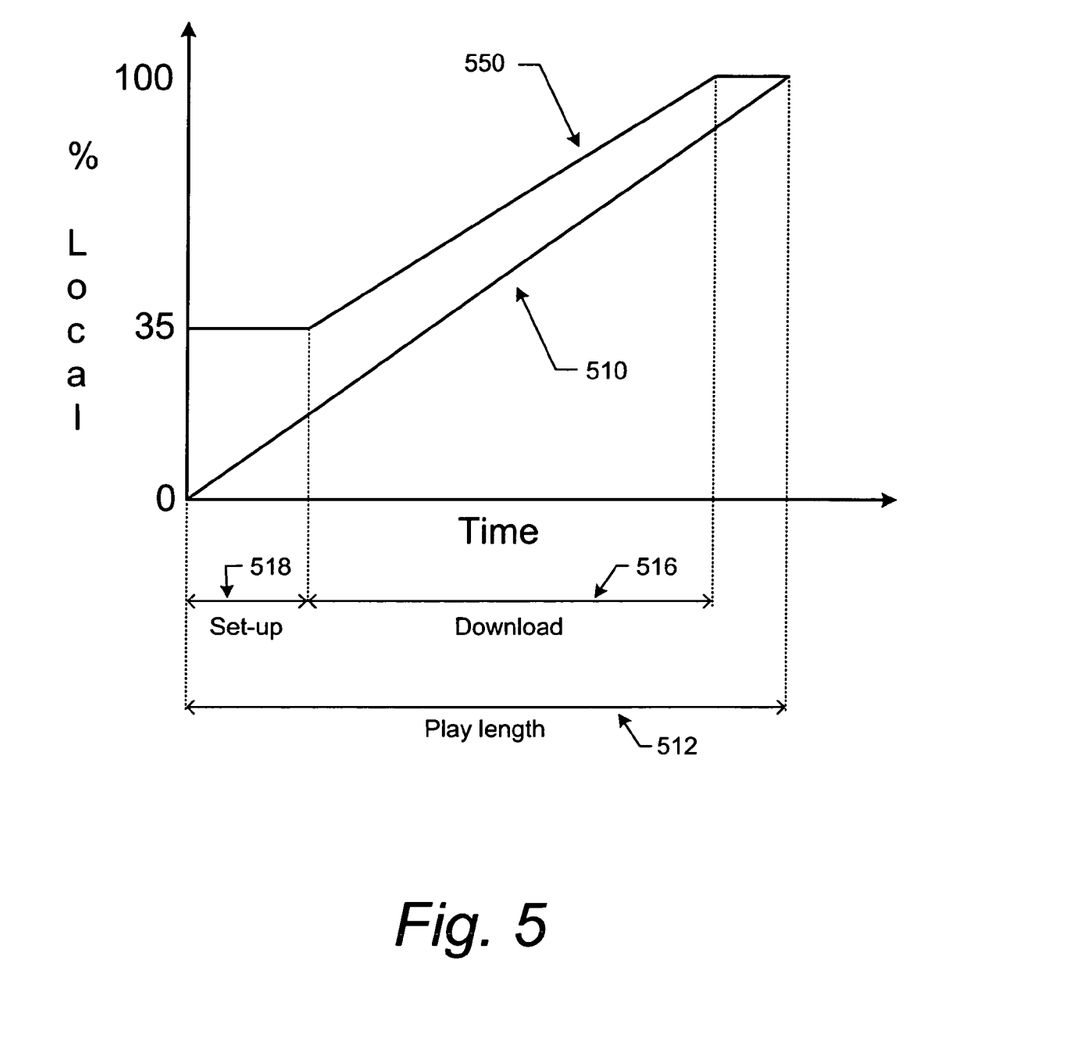
FIG. 5 illustrates a graph of the percentage of a media file that is stored locally as a function of time compared to the percentage of the media file that has been played as a function of time, in accordance with one embodiment of the invention.

FIG. 5 illustrates a graph of the percentage of a media file that is stored locally as a function of time compared to the percentage of the media file that has been played as a function of time, in accordance with one embodiment of the invention. Shown are "play curve" 510 and a "local curve" 550. The play curve 510 represents how much of a media file, as a percentage of the whole, has been rendered or played when a user accesses the file. The play length 512 represents the total amount of time it takes to render the entire file.

In contrast, the local curve 550 represents the amount of the media file, as a percentage of the whole, that is resident locally. Initially, something less than the entire media file is resident locally, such as 35% of the file. The download time 516 is the time it takes to download or retrieve the missing portion of the media file, 65% of the content in this example. The "set-up" time 518 is the time that it takes for the local device to establish a session with the remote device on which resides the missing portion of the media file and to begin retrieving or downloading the missing content.

As illustrated in FIG. 5, the percentage of the media file that may be trimmed, while still presenting the user with a seamless replay experience, is controlled by the set-up time 518 and the download time 516. In other words, so long as the set-up time 518 and the download time 516 do not exceed the play length 512, the missing content may be retrieved without the user realizing that the entire file was not resident locally when the user first initiated playback. The set-up time 518 is a function of the time it takes for the local device to initiate and negotiate a communication session with the remote device containing the user's library, and to initiate the download or retrieval of the missing portion of the media file. Based on the communication protocol and hardware, the set-up time 518 could be any length of time from milliseconds to several seconds. The download time 516 is a function of the bandwidth of the communications link between the local device and the server. If the link is a high latency or low bandwidth connection, the download time 516 could be lengthy. In contrast, if the link is a high bandwidth or low latency connection, the download time 516 could be very fast, even a few seconds. In the case where the communication link is very fast, a large percentage of the media file could be trimmed without sacrificing the illusion that the entire file is local.

It should also be noted that while it is preferred that the missing content be retrieved without the user noticing its absence, such is not necessary to the invention. In other words, the invention may be implemented in embodiments where the user experiences the fact that a portion of the media is missing. For example, the thresholds for trimming content could be aggressive enough that in some cases the missing content cannot be retrieved quickly enough to avoid some skipping or hesitation in the playback of some files. This configuration has the benefit that the maximum number of media files could be represented, at least partially, on the local storage medium. Alternatively, the thresholds could be conservative enough that the missing content will always (or nearly always) be retrieved before the expiration of the play length 512. This configuration has the additional benefit that a minimum amount of data would require retrieval, which may be a concern in wireless environments where bandwidth is limited, regulated, or incurs a usage fee.

FIG. 6 is a functional block diagram generally illustrating one system 601 in which the invention may be implemented. The system 601 includes a mobile device 610 and a server 650. The mobile device 610 could be any computing device on which media content may be stored. At least a portion of a user's digital media collection is stored on the mobile device 610, and at least one media file on the mobile device 610 has been partially trimmed as described above. The mobile device 610 includes a media control component 611 that is configured to retrieve or download missing content for media files in response to those files being accessed.

In this embodiment, the mobile device 610 is in communication over a wireless link 620 with the server 650. In one example, the mobile device 610 could be a handheld cellular telephone, and the server 650 could be part of a file hosting service that makes content available over the wireless link 620. The server 650 is configured to make content available for on-demand download by the mobile device 610. In particular, the server 650 is configured to allow downloading of partial file content from a position within the file as identified by the mobile device 610. The server 650 may include the user's complete digital media collection in a library 652, and at least includes the missing content 654 that has been trimmed from the media file 612.

In accordance with this embodiment, if the user accesses the partially resident media file 612, the media control component 611 causes rendering of the media file 612 to begin immediately. For example, if the media file 612 is a song, the media control component 611 may cause the song to begin playing the locally resident portion of the media file 612. In addition, the media control component 611 causes the missing portion of the media file 612 to be retrieved from the server 650.

More specifically, the mobile device 610, under control of the media control component 611, initiates a session with the server 650 and requests to download the missing content 654. The server 650 may also require the mobile device 610 to provide the appropriate credentials to ensure that the user of the mobile device 610 has the rights to retrieve the missing content 654. When the session is established, the server 650 transmits the missing content 654 to the mobile device 610 over the wireless link 620. The media control component 611 reincorporates the missing content into the media file 612 as it is being rendered.

It should be appreciated that even though the media file 612 is partially fetched from the server 650, the user experience is one of immediate access. The amount of content retrieved from the server 650 is variable. The longer a media file has been "dormant" (i.e., not recently accessed) the more content will need to be retrieved from the server 650. For example, a song that has only recently begun to digitally deteriorate would require the shortest over-the-air download. Once downloaded, the song remains resident on the mobile device 610 until it is again "stale." The net effect of this technique is to keep resident the content that the user accesses most frequently, while retrieving older content only at the user's request and, then, seamlessly, in the background.

Figure 7:
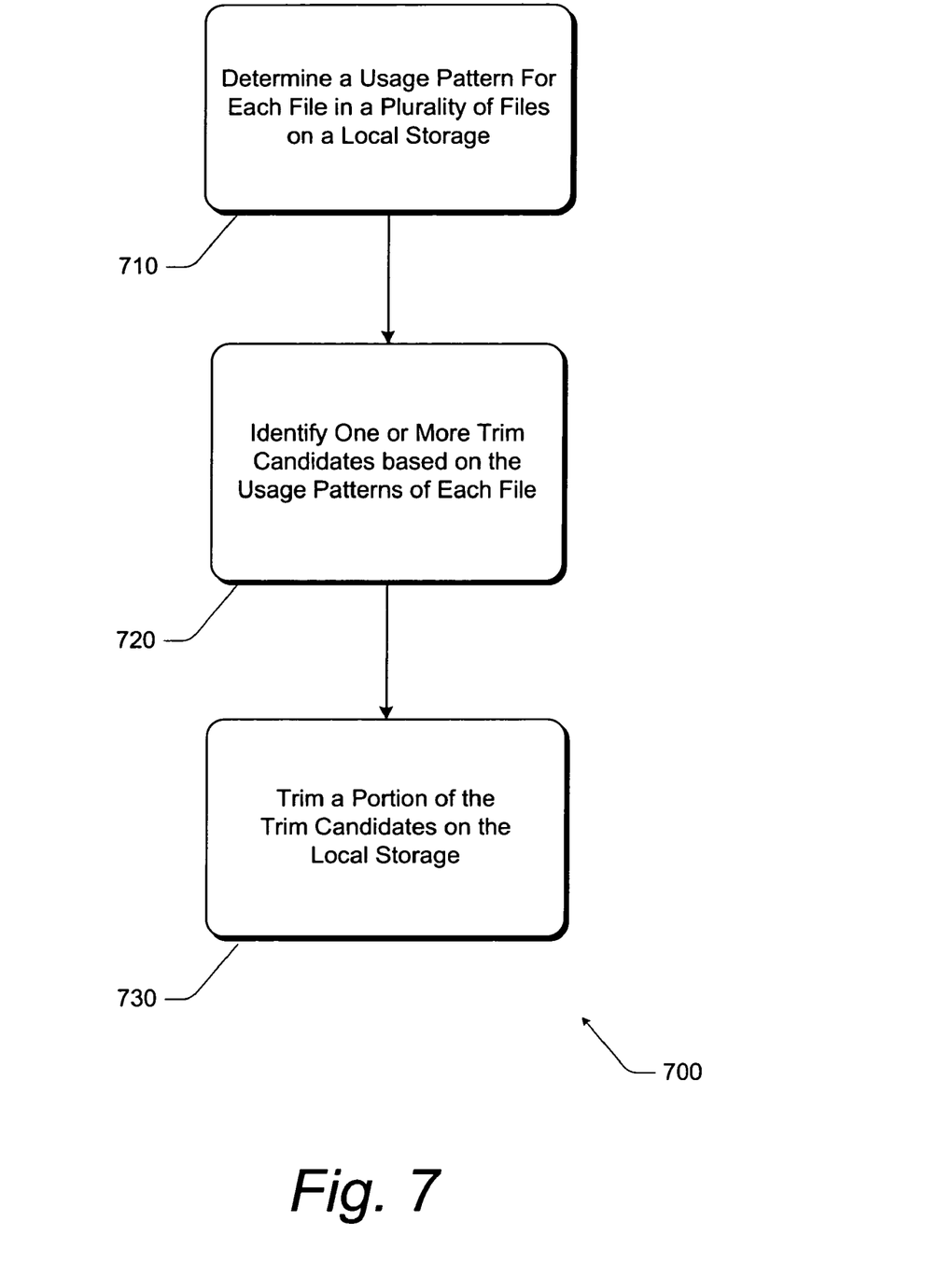
FIG. 7 is an operational flow diagram generally illustrating a process for trimming a media file on a mobile device, in accordance with one implementation of the invention.

FIG. 7 is an operational flow diagram generally illustrating a process 700 for trimming a media file on a mobile device, in accordance with one implementation of the invention. The process 700 may be implemented on a computing device, such as a mobile or fixed computing device, on which are stored media files. The media files represent at least part of a library of media files.

The process 700 begins at step 710, where usage data or heuristics are collected for each of the stored media files. The usage data identifies how frequently each of the media files are accessed on the computing device. In one example, if the media files are songs, the usage data may indicate how frequently and/or how recently each of the songs has been played.

At step 720, "trim candidates" are identified from the media files stored on the computing device. The trim candidates represent a subset of the media files that are least frequently accessed on the computing device. The trim candidates may be identified from the usage or heuristic data that is collected by components of the computing device.

At step 730, each of the trim candidates is trimmed, meaning that a portion of the content of the media files identified as trim candidates is eliminated from local storage on the computing device. In other words, the trim candidates may be truncated to a smaller, trimmed media file. Preferably, the trim candidates are trimmed from the end of the media file forward, thus leaving the beginning of the media on the computing device. The trimming may be based on the usage heuristics collected in conjunction with step 710. The usage heuristics may be used to increase or decrease the amount of the media files that are trimmed.

Figure 8:
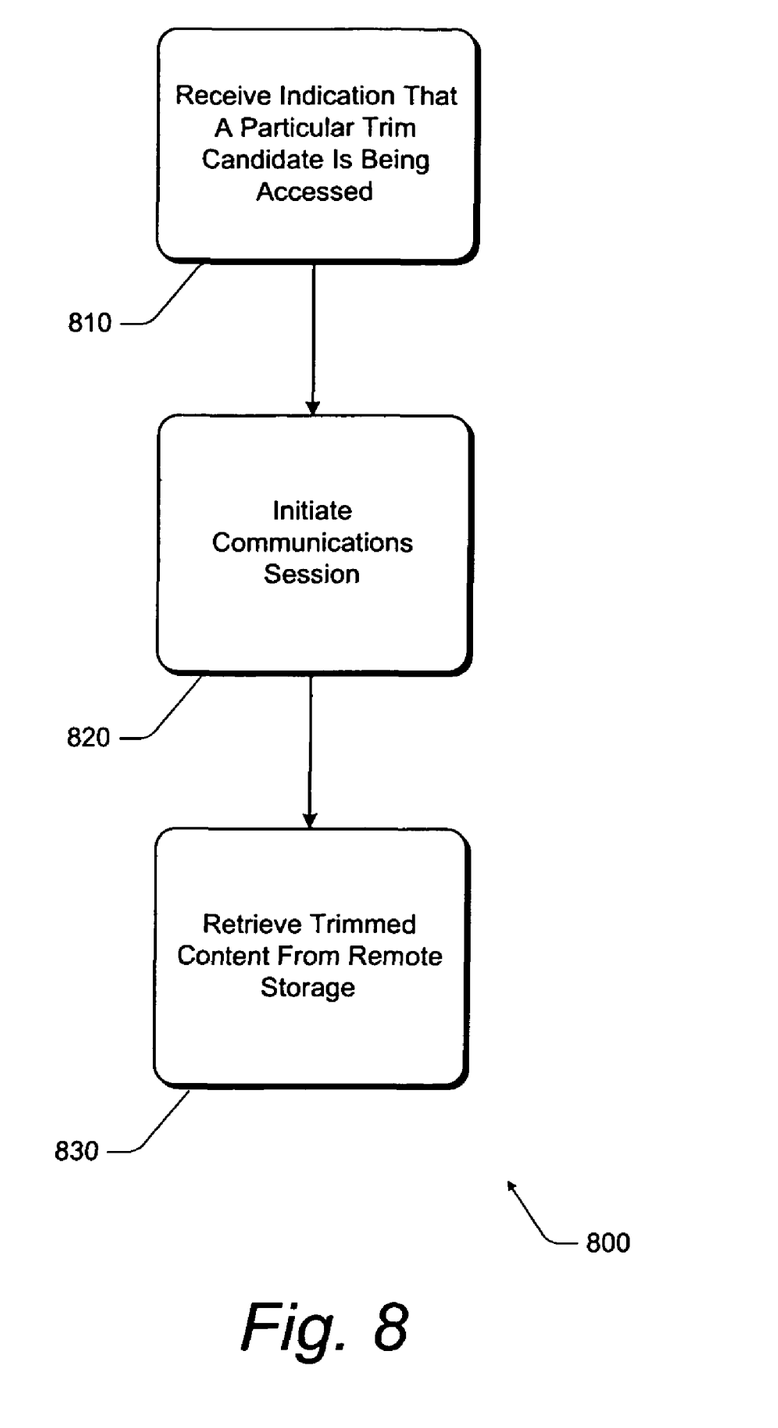
FIG. 8 is another operational flow diagram generally illustrating a process for retrieving content that has been trimmed from media files at a computing device.

FIG. 8 is another operational flow diagram generally illustrating a process 800 for retrieving content that has been trimmed from media files at a computing device. The process 800 is performed on a mobile device on which are stored media files that include trimmed media files. The term mobile device is used generally to describe a computing device that is separate from a content server including a library of complete media files, and may include computing devices that are not, in fact, mobile or portable.

At step 810, an indication is received at the computing device that a particular trim candidate is being accessed. For example, a media file that has been trimmed because it was infrequently accessed (e.g., played) may now have been launched by a user. Launching a trimmed media file causes the rendering of the trimmed media file to begin immediately, and also causes a notice to retrieve the trimmed content to be issued. It should be noted that rendering the trimmed media file may be occurring while one or more of the remaining steps of this process 800 are being performed, thus providing the user with the illusion that the media file has not been trimmed.

At step 820, a communications session may be initiated to retrieve the trimmed content from remote storage. For instance, a communications session using a wireless link, such as a cellular communications session, or a wired link, such as a conventional Ethernet network connection, may be established to support retrieving the trimmed content. The session is established with a remote content server, which may be a server computing device on which resides media files associated with the user's media library. The remote storage includes, at least, the portion of the particular trim candidate that has been eliminated from the computing device.

At step 830, the trimmed content is retrieved from the remote storage as the particular trim candidate is being accessed. More specifically, rendering the trim candidate was initiated (e.g., playing a music file is begun) prior to or in conjunction with step 810, and while that trim candidate is being rendered, the missing portion of the media file (i.e., the trimmed content) is retrieved from the remote storage and reincorporated into the media file. Preferably, the trimmed content is reincorporated in such a fashion that the rendering of the media file may be performed seamlessly and without the hesitation that may ordinarily be associated with downloading media content over a communications link.

The mechanisms for retrieving content could be further enhanced by applying heuristics, again based on usage or, perhaps, certain assumptions. For example, if the user has started to play a particular album (or other collection of media), the computing device could begin downloading any portions of nonresident songs on that album to insure that all the songs are available without further download. Likewise, if the device has been set to play songs from the music library in random order, nonresident songs could be pre-fetched during a single network connection.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations, modifications, additions and improvements fall within the scope of the invention as detailed within the following claims.

I claim:

1. A method for managing data storage on a device, comprising:
    determining a usage pattern of a user for each file in a plurality of files on a local storage, the usage pattern of the user for each file in the plurality of file being changeable;
    identifying one or more trim candidates from the plurality of files based on the usage pattern of each file;
    trimming a portion of the one or more trim candidates on the local storage by deleting less than all media content from the end of the file in each of the one or more trim candidates;
    re-determining the usage pattern for the one or more trim candidates that have been previously trimmed;
    trimming an additional amount from those one or more trim candidates determined to have been previously trimmed based on the re-determining usage pattern;
    determining whether any of the one or more trim candidates has been trimmed to a minimum size;

not trimming further those one or more trim candidates determined to have been trimmed to a minimum size;

in response to an indication that a particular trim candidate is being accessed, rendering the particular trim candidate remaining on the local storage; and retrieving the trimmed portion of the particular trim candidate while the particular trim candidate is being rendered.

2. The method recited in claim 1, wherein the plurality of files on the local storage comprises digital media files.

3. The method recited in claim 1, wherein the device comprises a mobile computing device, the plurality of files comprise media files, and the usage pattern for each media file comprises a frequency that the media file is rendered on the mobile computing device.

4. The method recited in claim 3, wherein identifying the trim candidates comprises identifying media files that are rendered less frequently than a given threshold.

5. The method recited in claim 1, wherein a sufficient amount of the media file is not truncated to allow for the truncated amount to be retrieved as the media file is being rendered from the beginning portion.

6. A method for managing data storage on a device, comprising:

identifying one or more trim candidates from a plurality of files stored on local storage;

trimming a portion of each of the trim candidates on the local storage by deleting less than all media content from the end of the file in each of the trim candidates, the trimming being based on usage heuristics of a user associated with each file of the plurality of files, the usage heuristics associated with each file of the plurality of files being changeable;

re-determining the usage heuristics for the one or more trim candidates that have been previously trimmed;

trimming an additional amount from those one or more trim candidates determined to have been previously trimmed based on the re-determining usage heuristics;

determining whether any of the one or more trim candidates has been trimmed to a minimum size;

not trimming further those one or more trim candidates determined to have been trimmed to a minimum size;

receiving an indication that a particular trim candidate is being accessed;

in response to an indication that a particular trim candidate is being accessed, rendering the particular trim candidate remaining on the local storage; and retrieving the trimmed portion of the particular trim candidate from remote storage while the particular trim candidate is being rendered.

7. The method recited in claim 6, wherein the device comprises a mobile computing device, the plurality of files comprise media files, and the usage heuristics for each of the media files identify how frequently each file of the media files is rendered on the mobile computing device.

8. The method recited in claim 7, wherein identifying the trim candidates comprises identifying media files that are rendered less frequently than a given threshold.

9. The method recited in claim 6, wherein a sufficient amount of the media file is not truncated to allow for the truncated amount to be retrieved as the media file is being rendered from the beginning portion.

10. The method recited in claim 9, wherein the sufficient amount is determined based on characteristics of a communications link between the device and a remote server on which is stored the truncated amount.

11. The method recited in claim 9, wherein the sufficient amount is determined based on an expected download time of the truncated amount and a set-up time of a communications link between the device and a remote server on which is stored the truncated amount.

12. The method recited in claim 11, wherein the set-up time of the communications link and the download time of the truncated amount are together less than a play length of the media file.

13. A non-transitory, tangible, computer-readable medium having stored thereon processor-executable software instructions configured to managing data storage on a device, which, when executed by a computer, cause a processor to perform operations comprising:

identifying one or more trim candidates from a plurality of files stored on local storage;

trimming a portion of the one or more trim candidates, the trimming being based on usage heuristics of a user associated with each file of the plurality of files, the usage heuristics associated with each file of the plurality of files being changeable;

re-determining the usage heuristics for the one or more trim candidates have been previously trimmed;

trimming an additional amount from those one or more trim candidates determined to have been previously trimmed based on the re-determining usage heuristics;

determining whether any of the one or more trim candidates has been trimmed to a minimum size;

not trimming further those one or more trim candidates determined to have been trimmed to a minimum size;

receiving an indication that a particular trim candidate is being accessed; and retrieving the trimmed portion of the particular trim candidate from remote storage as the particular trim candidate is being accessed;

rendering the particular trim candidate remaining on the local storage in response to the received indication that the particular trim candidate is being accessed; and retrieving the trimmed portion of the particular trim candidate while the particular trim candidate is being rendered.

14. The computer-readable medium recited in claim 13, wherein the device comprises a mobile computing device, the plurality of files comprise media files, and the usage heuristics for the media files identify how frequently the media files are rendered on the mobile computing device.

15. The computer-readable medium recited in claim 14, wherein the computer-readable medium has processor-executable software instructions configured to cause the processor to perform further steps comprising:

identifying media files that are rendered less frequently than a given threshold.

16. The computer-readable medium recited in claim 13, wherein a sufficient amount of the media file is not truncated to allow for the truncated amount to be retrieved as the media file is being rendered from the beginning portion.

17. The computer-readable medium recited in claim 16, wherein the sufficient amount is determined based on characteristics of a communications link between the device and a remote server on which is stored the truncated amount.

18. The computer-readable medium recited in claim 16, wherein the sufficient amount is determined based on an expected download time of the truncated amount and a set-up time of a communications link between the device and a remote server on which is stored the truncated amount.

19. The computer-readable medium recited in claim 18, wherein the set-up time of the communications link and the download time of the truncated amount are together less than a play length of the media file.

20. A mechanism for managing data storage on a device having a plurality of files, comprising:
   a communications module configured to facilitate communications between the device and a remote content server;
   a storage medium on which resides the plurality of files;
   a rendering module configured to render a particular trim candidate remaining on the local storage in response to an indication that the particular trim candidate is being accessed; and
   a media control component configured to monitor usage of the plurality of files by a user to identify trim candidates, the trim candidates being media files that are accessed less frequently than a given threshold, the media control component being further configured to trim the trim candidates by eliminating less than all media data from the end of the file from the trim candidates on the storage medium,
   the media control component being further configured to
   further monitoring the usage of trim candidates which have previously been trimmed,
   trim additional media data from the end of the file on the storage medium of trim candidates identified as having previously been trimmed based the further monitored usage,
   determine whether any of the one or more trim candidates has been trimmed to a minimum size, and
   not trim further those one or more trim candidates determined to have been trimmed to a minimum size,
   the media control component being further configured to retrieve the eliminated data for the particular trim candidate portion of the particular trim candidate while the particular trim candidate is being rendered.

21. The mechanism recited in claim 20, wherein the plurality of files comprises media files.

22. The mechanism recited in claim 20, wherein the media control component is further configured to retrieve the eliminated data for a particular trim candidate while the particular trim candidate is being accessed in response to an indication that the particular trim candidate is being accessed.

23. The mechanism recited in claim 22, wherein the eliminated data is retrieved from the remote content server using the communications module.

24. The mechanism recited in claim 22, wherein the communications module is configured to communicate using a wireless communications link.

25. The mechanism recited in claim 22, wherein the communications module is configured to communicate using a hard wired communications link.

26. A system for managing data storage, comprising:
   a content server including:
      a library of media files, and a server communications module configured to serve at least a portion of a media file in the library of media files; and a mobile device including:
      a communications module configured to facilitate communications between the mobile device and the content server;
      a storage medium on which resides the plurality of files, a rendering module configured to render a particular trim candidate remaining on the local storage in response to an indication that the particular trim candidate is being accessed; and
      a media control component configured to monitor usage of the plurality of files by a user to identify trim candidates, the trim candidates being media files that are accessed less frequently than a given threshold, the media control component being further configured to trim the trim candidates by eliminating less than all media data from the end of the file from the trim candidates on the storage medium,
   the media control component being further configured to
   further monitoring the usage of trim candidates which have previously been trimmed,
   trim additional media data from the end of the file on the storage medium of trim candidates identified has having previously been trimmed based on the further monitored usage,
   determine whether any of the one or more trim candidates has been trimmed to a minimum size, and
   not trim further those one or more trim candidates determined to have been trimmed to a minimum size,
   the media control component being further configured to retrieve, in response to the indication that the particular trim candidate is being accessed, the eliminated data from the content server for a particular trim candidate while the particular trim candidate is being rendered.

* * * * *